United States Patent [19]

Botzman

[11] Patent Number: 4,704,176

[45] Date of Patent: Nov. 3, 1987

[54] METHOD OF BONDING POLYURETHANE TO CURED RUBBER

[75] Inventor: Thomas J. Botzman, Akron, Ohio

[73] Assignee: The Goodyear Tire & Rubber Company, Akron, Ohio

[21] Appl. No.: 888,596

[22] Filed: Jul. 23, 1986

Related U.S. Application Data

[63] Continuation of Ser. No. 683,455, Dec. 19, 1984, abandoned.

[51] Int. Cl.[4] .................... B29C 35/02; B29D 9/00; B32B 7/12
[52] U.S. Cl. .................................. 156/125; 156/96; 156/123; 156/128.6; 156/315; 156/332; 156/338; 264/135; 264/265; 264/269; 264/275
[58] Field of Search ............... 264/46.6, 46.9, 135, 264/255, 331.13, 331.19, 265, 269, 275; 525/263, 310; 156/96, 125, 128.6, 315, 332, 338, 123

[56] References Cited

U.S. PATENT DOCUMENTS 4,240,852  12/1980  Gomberg et al. ................. 156/96
4,451,615  5/1984  Charnock ......................... 525/98

Primary Examiner—James Lowe
Attorney, Agent, or Firm—H. C. Young, Jr.

[57] ABSTRACT

A method of preparing a composite of polyurethane bonded to the surface of a cured rubber substrate and the resulting composite. The method is comprised of first applying to a cleaned, cured rubber surface a coating of methylmethacrylate-natural rubber graft polymer and then applying a liquid polyurethane reaction mixture which is cured to form the resultant composite. The invention is particularly directed to the preparation of a tire comprised of a polyurethane carcass applied to a cured rubber tread and to a tire comprised of a polyurethane tread applied to a cured rubber carcass.

9 Claims, No Drawings

METHOD OF BONDING POLYURETHANE TO CURED RUBBER

This is a continuation, of application Ser. No. 683,455 filed on Dec. 19, 1984 now abandoned.

FIELD

This invention relates to a method of preparing a composite of polyurethane bonded to cured rubber through an adhesive interface. The invention further relates to such prepared composite. The invention particularly relates to a method of preparing a composite of tire comprised of a polyurethane tire carcass bonded to a cured rubber tread. The invention further relates to a composite of a tire comprised of a polyurethane tread bonded to a cured rubber tire carcass.

BACKGROUND

It is sometimes desired to prepare composites of polyurethane bonded to cured rubber for various purposes, particularly where it is desired to obtain the advantages of the properties each or both of such materials in an individual application.

For example, it may be desired to provide a vehicular tire with a rubber carcass having an outer circumferential tread of polyurethane.

It may also be desired to provide a vehicular tire with a cured rubber tread and a polyurethane carcass.

Additionally, other products, including various industrial products may be desired as laminates of cured rubber and polyurethane.

However, particularly for such composites which are normally expected to experience a considerable amount of flexing, compression and various degrees of distortion during their use, an important point of early failure can be the interface between the cured rubber substrate and the polyurethane.

Although the relationship between the two types of materials is complex and depends upon many factors, it is important to appreciate that effectively adhering a relatively polar polyurethane substance to the surface of a relatively non-polar cured rubber substrate can be difficult.

Various adhesive systems have been tried and sometimes suggested for such purpose. However, for many applications, the resulting bond strengths are simply insufficient to provide an effective composite laminate which will not easily delaminate under extensive working conditions, particularly under shear force conditions.

Therefore, it is an aspect of this invention to provide a composite of a polyurethane bonded to the surface of a cured rubber substrate.

SUMMARY AND OPERATION

In accordance with this invention, a method of preparing a composite of a polyurethane bonded to a surface of a cured rubber substrate comprises the steps of
(A) cleaning a surface of a cured rubber substrate.
(B) Applying at least one coating to said cleaned substrate surface as a dispersion of a methylmethacrylate-natural rubber graft polymer in a volatile organic diluent and drying the resultant coat to remove said diluent.
(C) Applying a liquid polyurethane reaction mixture to said coated substrate surface.
(D) Curing said reaction mixture to form a composite of polyurethane bonded to cured rubber substrate through said applied coating.

In further accordance with this invention, a composite is provided comprised of polyurethane bonded to a cured rubber substrate prepared by such method.

The methylmethacrylate-natural rubber graft polymer can be described as a graft polymer comprised of methyl methacrylate grafted to natural rubber in a mole ratio in the range of about 0.25/1 to about 1.5/1, preferably about 0.4/1 to about 1/1, (methyl methacrylate to natural rubber.

The graft polymer can typically be prepared by free radical polymerizing methyl methacrylate monomer in a natural rubber aqueous latex in the presence of a peroxide initiator.

It is important to appreciate that the cured rubber substrate also contains conventional rubber compounding ingredients including carbon black, processing oil, zinc oxide, a stearate such as zinc stearate, sulfur and antidegradants.

It is important that the surface of the sulfur cured rubber substrate is cleaned prior to application of the graft polymer solution in order to remove surface oils and other foreign substances which may be present. The purpose is to provide a fresh, exposed rubber surface substantially free from typical surface oils and other contaminants.

The cleaning of the cured rubber surface can be done by various means such as by organic solvent, aqueous soap solution washing, abrading or a combination thereof. If the organic solvent or aqueous soap solution method is used, the treated surface is dried before application of the graft polymer solution. Abrading of the rubber surface can be accomplished by various means such as by buffing with wire wheel, abrasive grinding wheel or shot blast treatment to abrade away a part of the surface to leave it both clean and roughened. A roughened rubber surface apparently tends to aid in improving adhesion in the practice of this invention.

In practice, usually the surface is first abraded, such as by buffing, and then washed with an organic solvent. Typically such solvents might be, for example, methylene chloride or methyl ethyl ketone. All of these are well-known methods of cleaning cured rubber surfaces to those having skill in such art.

A particular application of this invention is the preparation of a tire having a polyurethane carcass applied to a cured rubber tread. For such tire, the ruober tread is first pre-formed and cured as a circular element which is intended to become a peripheral, circumferential portion of the tire.

For such application, a composite in the form of a tire is prepared by the steps of
(A) Obtaining a cured rubber tire tread composed of an outer rubber tread portion and an inner, exposed rubber portion.
(B) Cleaning the inner surface of said inner tread portion.
(C) Applying at least one coating to said cleaned inner tread surface of a dispersion of methylmethacrylate-natural rubber graft polymer in a volatile organic diluent and drying the resultant coat.
(D) Applying a liquid polyurethane reaction mixture to said coated surface in a molding environment having the shape of a desired tire carcass.
(E) Curing said reaction mixture in said molding environment to form said composite as a polyurethane tire carcass bonded to a cured rubber tread through said applied coating.

In further accordance with this invention, a tire is provided which comprises a polyurethane tread bonded to a cured rubber carcass prepared according to such method.

In the practice of this invention it is preferred that the said inner rubber portion of the tread is fabric reinforced with a textile woven fabric imbedded therein such as, for example, a tire cord fabric. Such fabric can be of various filaments and/or yarns such as, for example, polyester, nylon, aramid, glass and metal such as steel. A primary purpose of such reinforcement is to restrict growth in diameter of the tread during its use as a component of the resultant tire composite and to generally add strength to the tread structure.

An additional application of this invention is the preparation of a composite as a tire having a polyurethane tread applied circumferentially to the periphery of a cured rubber tire carcass.

For such application, a composite in the form of a tire is prepared by the steps of (A) Obtaining a toroidally shaped cured rubber tire carcass, said carcass having a circumferential, outer, exposed rubber portion.

(B) Cleaning the said outer, exposed surface of the outer rubber portion of said carcass.

(C) Applying at least one coating to said cleaned outer carcass surface as a dispersion of methylmethacrylate-natural rubber graft polymer in a volatile organic diluent and drying the resultant coat.

(D) Applying a liquid polyurethane reaction mixture to said coated surface of the carcass in a molding environment having the shape of a desired tire tread.

(E) Curing said reaction mixture in said molding environment to form said composite as a polyurethane tread bonded to a cured rubber tire carcass through said applied coat.

In practice, it may often be desired that the edges of the tread extend over a portion of the sidewall of the carcass adjacent to the tread.

In further accordance with this invention, a tire is provided which comprises a polyurethane carcass bonded to a cured rubber tread prepared according to such method.

The practice of this invention is described as being particularly applicable to the preparation of tires. Such tires are described as being constructed of an outer circumferential tread and a carcass. As will be readily known and observed by one having skill in the tire art, the outer portion of the tread is adapted to be surface contacting such as for example, ground contacting, its inner portion faces and joins the carcass which provides support for the tread. The carcass can be composed of various elements and can contain reinforcement such as a fabric reinforcement.

The tire carcass is referred as being generally toroidal shaped which is the conventional shape of a tire and is intended to include the typical open toroid tire carcass configuration.

In the practice of this invention, the graft polymer is applied to the cleaned cured rubber substrate as a dispersion in an organic diluent. It is to be understood that a portion of the graft polymer may, dissolve in the diluent and thus form a solution. The term "dispersion" is intended to describe the dispersion of the graft polymer in the diluent which may also contain and include the graft polymer in the form of a solution. For this purpose, various organic diluents can be used, although it is preferred as a limitation, that such solvents do not unnecessarily or excessively damage the cured rubber surface. Thus, materials such as dimethyl sulfoxide, dimethylformamide and tetrahydrofuran are generally not desired. The graft polymer itself is relatively insoluble in many diluents or solvents so that it can conveniently be applied as a dispersion in an organic diluent such as, for example, a mixture of toluene and methyl ketone. Such mixture may also contain a small amount (3 weight percent) of trichloroethane to aid in surface wetting.

The graft polymer dispersion and/or solution can be applied to the cured rubber surface at ambient conditions (20° C.–30° C.), although it is sometimes preferred that the cured rubber surface has a temperature in the range of about 50° C. to about 95° C. in order to increase the rate of evaporation of the diluent of solvent.

Although one coat of the graft polymer solution can be applied, because each application typically results in a very thin coating, it is usually desired that from 1 to 5, more preferably from 2 to 4 coatings are applied for the purpose of providing good coverage of the rubber surface.

In practice, it is preferred that each individual graft polymer coat is dried before applying another coat. It is believed that the effective, ultimate resultant adhesive bond will be enhanced by such procedure.

Typically, a coating of up to about one to 3 mils of graft polymer is deposited on the cured rubber surface. The amount deposited is not considered particularly critical except that it is to be emphasized that the coating is thin yet adequately covers the rubber surface.

The graft polymer coating can be dried at room temperature such as about 20° C. to about 30° C. although it may sometimes more desirable to dry the coating at a temperature of about 75° C. to about 100° C. in a hot air oven in order to reduce the drying time.

The polyurethane reaction mixture is applied as a liquid under molding environment conditions to the coated, cured rubber surface. It is preferred that the coated rubber surface is about 30° to about 100° C. The reaction mixture is liquid primarily because the reactants are chosen so that the mixture is in a liquid form.

By the term molding environment conditions, it is meant that the liquid mixture is applied within a containment that has a shape suitable for the desired article to be obtained upon curing the liquid mixture to form a solid material such as a tire carcass, tire tread or other desired article such as an industrial product. In the molding environment it is contemplated that it may often be desirable to first place the cured rubber substrate such as cured rubber carcass or cured rubber tread into a suitable mold to which is then applied the liquid reaction mixture.

The liquid reaction mixture is then cured at a suitable temperature such as room or ambient temperature (20° C. to 30° C.), or at a temperature in the range of about 20° C. to about 130° C., although preferably it is cured at a temperature in the range of about 80° C. to about 120° C.

It is important to appreciate that the polyurethane is cured against the graft polymer coated cured rubber substrate to achieve the bonding effect.

The degree of effective bonding was tested by a laboratory procedure. In such procedure, test samples as laminates of layers of 6"×1" (15 cm×2.5cm) polyurethane (½" or 1.3 cm thick) and cured rubber (⅛" to ¼" 0.3 cm to 0.6 cm thick) are bonded through the applied coatings according to the method of this invention. The samples are tested at a series of temperatures, including 25° C. and 121° C., by a 180° peel test in which the layers of polyurethane and cured rubber are pulled apart with an Instron tester at a crosshead speed of 2 inches per minute and the force needed to pull them apart is measured and observed as pounds of force for the one inch wide sample and expressed as pounds per inch (lb/in).

In accordance with the practice of this invention, such laminates of polyurethane to cured rubber are provided typically having a bond strength in the range of about 8 at least about 12 pounds per inch (lb/in) at 25° C. and in the range of about 4 to at least about 8 (lb/in) at about 120° C. according to this test, depending somewhat upon the nature of the rubber and polyurethane and characteristics of the interfacing coatings.

An important observed characteristic was that the rubber substrate itself would tend to tear instead of the polyurethane/rubber interface, thus demonstrating the resistance of the bonding interface to shear failure.

In the practice of this invention, the said cured rubber substrate surface to which the sequential coats are applied and the polyurethane adhered can for example, be of various cured rubbers such as for example those comprised of at least one of natural rubber, synthetic cis 1,4-polyisoprene, cis 1,4-polybutadiene, styrene/butadiene copolymer, butyl, chlorobutyl, bromobutyl and EPDM rubber it is to be understood that such rubbers are compounded with typical rubber compounding ingredients which conventionally include carbon black, zinc oxide, stearate, sulfur, accelerator(s) and rubber processing oil. Other ingredients might be used such as various antidegradants, pigments and conventional other compounding ingredients. It is generally desired that only a minimal of oil, if any, be contained in the cured rubber in order that a better bond can be obtained.

In the practice of this invention the said polyurethane reaction mixture is prepared according to methods known to those having skill in the polyurethane art. Various polyurethane reaction mixture recipes can be used, depending somewhat upon the cured polyurethane properties desired. For this invention the term "polyurethane" is also intended to include polyureaurethanes.

For example, a polyurethane reaction mixture may be comprised of (i) a prepolymer of at least one polyisocyanate having an average NCO content of about 2.1 to about 2.5 and a polymeric polyol selected from at least one of polyester polyol, polyether polyol and polybutadiene polyol having an average hydroxyl functionality of about 2 to about 3 and a molecular weight in the range of about 2000 to about 4000 where the NCO/OH ratio is in the range of about 1.5 to about 2.5 and (ii) a curative for said prepolymer selected from at least one diamine, preferably a primary diamine such as, for example, methylene dianiline, a sodium chloride complex with 4,4' methylene dianiline in dioctylphthalate, diethyl 2,4-diamine, trimethylene glycol di-para-amino benzoate and meta phenylene diamine or a monomeric diol such as, for example, ethylene glycol, 1,3-propane diol, 1,4-butane diol, hydroxy ethyl hydroquinone, and trimethylolpropane. A polycaprolactone derived from caprolactone and a small amount of diglycidal ether has been found to be a particularly useful polyester polyol.

The ratio of primary amine groups of the diamine or hydroxyl groups of the monomeric diol to the excess of NCO groups over the OH groups of the prepolymer is typically in the range of about 0.75/1 to about 0.95/1.

Representative examples of various diisocyanates may include for example 1,6-hexamethylene diisocyanate, 1,10-decamethylene diisocyanate, 1,4-cyclohexylene diisocyanate, 4,4'-methylenebis(cyclohexylisocyanate), 1,5-tetrahydronaphthalene diisocyanate, isophorone diisocyanate, the 1,4- and 2,6-toluene diisocyanates, m-phenylene diisocyanate, diphenylmethane-4,4'-diisocyanate, hydrogenated diphenylmethane-4,4'-diisocyanate, and 3,3'-dimentyl-4,4-bis phenylene diisocyanate, as well as the polyalkylene-polyarylene isocyanates as more particularly referred to in U.S. Pat. No. 2,683,730.

If desired, the polyurethane may be loaded with various fillers to enhance its physical properties. Thus, the cured polyurethane may contain from about 5 to about 100 weight percent of typical particular rubber reinforcing fillers, such as carbon black, titanium dioxide, zinc oxide, calcium carbonate, filler clays, silicas and coloring pigments.

The tires can be pneumatic when using an internal air pressure for support of the tire structure, semipneumatic when using internal air for a partial support although relying primarily on the tire's own structure for support or the tire can be solid such as for industrial tire application.

The practice of this invention is further illustrated by reference to the following example which is intended to be representative rather than restrictive of the scope of the invention. Unless otherwise indicated, all parts and percentages are by weight.

EXAMPLE

A surface of a substantially square sulfur cured sheet having a width and length of about 8 inches (20 cm) and a thickness of about 0.5 inch (1.3 cm) was prepared by first buffing to abrade away its outer surface, then washing with methyl ethyl ketone and finally washing with chlorine water and drying the prepared surface.

The cured rubber sheet was composed of a mixture of natural rubber and styrene/butadiene rubber which had been compounded with ingredients including carbon black, rubber processing oil, zinc oxide, zinc stearate or stearic acid, sulfur, accelerator(s) and antidegradant(s).

The rubber sheet was heated to about 95° C.

To the cleaned and heated surface of the rubber sheet was applied a coat of a dispersion of a methylmethacrylate-natural rubber graft polymer as a 4.8 percent solids in a 50/50 mixture of toluene and methyl ethyl ketone. The graft polymer reportedly had a viscosity of somewhat less than 2000 poise as a 7 percent solids mixture in toluene and was the type prepared by free radical polymerizing methyl methacrylate in a natural rubber latex and recovering the product.

The coated rubber sheet was placed in a hot air oven at 95° C. for about one hour.

A liquid polyurethane reaction mixture was cast onto the hot surface of the coated rubber sheet and cured in a hot air oven at about 120° C. overnight (about 12 hours). The polyurethane reaction mixture was a mixture of a slightly less than a stoichiometric amount of a diol curative and an isocyanate terminated polyurethane prepolymer of 4,4' diphenylmethane diisocyanate and a polyesterpolyol (obtained as Mondur F-242 from the Mobay Chemical Corp.).

The resulting coated sheet was cut into one inch strips and submitted to testing for bond strength of the polyurethane to the rubber (through the graft polymer coating) by procedure hereinbefore described.

The bond strength was observed to be about 20 pounds per inch (lb/in) (3.5 kN/m) at about 23° C. and about 7 lb/in (1.2 kN/m) at 121° C. It is important to appreciate that a tearing of the actual rubber substrate occurred during test, indicating a high shear strength of the bond.

This Example demonstrated that a tire can suitably be prepared composed of a polyurethane tread bonded to a cured rubber carcass and a tire composed of a polyurethane carcass bonded to a cured rubber tread when using the methylmethacrylate-natural rubber graft polymer as an interface and a bonding medium between the said polyurethane and cured rubber surface.

While certain representative embodiments and details have been shown for the purpose of illustrating the invention, it will be apparent to those skilled in this art that various changed and modifications may be made therein without departing from the spirit or scope of the invention.

I claim:

1. A method of preparing a composite of a polyurethane bonded to a surface of a cured rubber substrate comprises the steps of
   (A) cleaning a surface of a cured rubber substrate,
   (B) Applying at least one coating to said cleaned substrate surface of a dispersion consisting essentially of methylmethacrylate-natural rubber graft polymer in a volatile organic diluent and drying the resultant cost to remove said diluent,
   (C) Applying a liquid polyurethane reaction mixture to said coated substrae surface,
   (D) Curing said reaction mixture a composite of polyurethane bonded to cured rubber through said sequentially applied coatings; wherein said graft polymer is prepared by polymerizing methylmethacrylate in a natural rubber aqueous latex and recovering the product.

2. The method according to claim 1 where cured rubber surface is heated to a temperature in the range of about 50° C. to about 95° C. prior to application of the graft polymer dispersion, where said dispersion is applied an amount of about 2 to about 5 coatings.

3. The method according to claim 1 where the cured rubber substrate surface is a cured rubber comprised of at least one of natural rubber, synthetic cis 1,4-polyisoprene, cis 1,4-polybutadiene, styrene/butadiene copolymer, butyl rubber, chlorobutyl rubber, bromobityl rubber and EPDM rubber containing carbon black, zinc oxide, stearate and rubber processing oil.

4. A method of preparing a composite in the form of a tire is prepared by the steps of
   (A) Obtaining a circular cured rubber tire tread composed of an outer rubber tread portion and an inner rubber portion having an exposed inner tread surface,
   (B) Cleaning the exposed inner surface of said inner tread portion,
   (C) Applying at least one coating to said cleaned inner tread surface of a dispersion consisting essentially of methylmethacrylate-natural rubber graft polymer in a volatile organic diluent and drying the resultant coat,
   (D) Applying a liquid polyurethane reaction mixture to said coated surface in a molding environment having the shape of a desired tire carcass,
   (E) Curing said reaction mixture in said molding environment to form said composite as a polyurethane tire carcass bonded to a cured rubber tread through said sequentially applied coatings; where said graft polymer is prepared by polymerizing methylmethacrylate in a natural rubber aqueous latex and recovering the product.

5. The method according to claim 4 where cured rubber surface is heated to a temperature in the range of about 50° C. to about 95° C. prior to application of the graft polymer dispersion and where said dispersion is applied an amount of about 2 to about 5 coatings.

6. The method according to claim 4 where the cured rubber substrate surface is a cured rubber comprised of at least one of natural natural rubber, synthetic cis 1,4-polyisoprene, cis 1,4-polybutadiene, styrene/butadiene copolymer, butyl, chlorobutyl bromobutyl and EPDM rubber containing carbon black, zinc oxide, stearate and rubber processing oil.

7. A method of preparing a composite in the form of a tire by the steps of
   (A) Obtaining a toroidally shaped cured rubber tire carcass, said carcass having a circumferential, outer, exposed rubber portion containing about 0 to about 25 phr of rubber processing oil,
   (B) Cleaning the outer, exposed surface of the said outer rubber portion of said carcass,
   (C) Applying at least one coating to said cleaned outer carcass surface of a dispersion consisting essentially of methylmethacrylate natural rubber graft polymer in a volatile organic diluent and drying the resultant coat,
   (D) Applying a liquid polyurethane reaction mixture to said coated surface of the carcass in a molding environment having the shape of a desired tire tread,
   (E) Curing said reaction mixture in said molding environment to form said composite as a polyurethane tread bonded to a cured rubber tire carcass through said sequentially applied coatings; wherein the said graft polymeer is prepared by polymerizing methylmethacrylate in a natural rubber aqueous latex and recovering the product.

8. The method according to claim 7 where cured rubber surface is heated to a temperature in the range of about 50° C. to about 95° C. prior to application of the graft polymer dispersion and where said dispersion is applied an amount of about 2 to about 5 coatings.

9. The method according to claim 7 where the cured rubber substrate surface is a cured rubber comprised of at least one of natural natural rubber, synthetic cis 1,4-polyisoprene, cis 1,4-polybutadiene, styrene/butadiene copolymer, butyl, chlorobutyl bromobutyl and EPDM rubber containing carbon black, zinc oxide, stearate and rubber processing oil.

* * * * *